US008219264B1

(12) United States Patent
Blake

(10) Patent No.: US 8,219,264 B1
(45) Date of Patent: Jul. 10, 2012

(54) CLOSE FORMATION FLIGHT POSITIONING SYSTEM USING AIR DATA MEASUREMENTS

(75) Inventor: William B. Blake, Xenia, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 613 days.

(21) Appl. No.: 12/479,889

(22) Filed: Jun. 8, 2009

(51) Int. Cl.
*G01C 23/00* (2006.01)
(52) U.S. Cl. ............................. 701/3; 701/300
(58) Field of Classification Search ............... 701/300, 701/301, 302, 3–9
See application file for complete search history.

(56) References Cited

U.S. PATENT DOCUMENTS

| | | | |
|---|---|---|---|
| 6,252,525 B1 * | 6/2001 | Philiben ........................ | 340/961 |
| 6,690,296 B2 * | 2/2004 | Corwin et al. ................ | 340/961 |
| 7,529,621 B2 * | 5/2009 | Reuveni et al. ............... | 701/301 |
| 2002/0133294 A1 * | 9/2002 | Farmakis et al. ............. | 701/301 |
| 2004/0059504 A1 * | 3/2004 | Gray ............................. | 701/301 |
| 2009/0259402 A1 * | 10/2009 | Gates et al. ................... | 701/301 |
| 2011/0178711 A1 * | 7/2011 | Christoph ..................... | 701/301 |
| 2011/0276268 A1 * | 11/2011 | Meysel ......................... | 701/301 |

* cited by examiner

*Primary Examiner* — Faye M. Fleming
(74) *Attorney, Agent, or Firm* — AFMCLO/JAZ; Fredric Sinder

(57) ABSTRACT

A close formation flight positioning system uses only air data measurements without a data link. The wake vortex of a lead aircraft generates horizontal, vertical and lateral induced velocities that vary with horizontal, vertical and lateral position from its wing. Two or more laterally or vertically separated air data sensors on a follower aircraft measure impact pressure, angle of attack and angle of sideslip, which are converted to horizontal, vertical and lateral velocity components. By comparing these velocity component measurements, using the distance between the sensors on the follower aircraft and the wing span of the lead aircraft, the distance from the follower to the lead aircraft can be determined. If weight, speed and altitude of the lead aircraft are known, then two sensors on the follower aircraft are sufficient to determine relative positions. If those conditions are not known, then three sensors on the follower aircraft are needed.

6 Claims, 6 Drawing Sheets

CLOSE FORMATION FLIGHT POSITIONING SYSTEM USING AIR DATA MEASUREMENTS

RIGHTS OF THE GOVERNMENT

The invention described herein may be manufactured and used by or for the Government of the United States for all governmental purposes without the payment of any royalty.

BACKGROUND OF THE INVENTION

The invention relates to a close formation flight positioning system using air data measurements. Military aircraft fly in formation for a variety of reasons. In some of these formations, the aircraft are sufficiently close to one another that the trailing wake from the lead aircraft affects the aerodynamic characteristics of the follower aircraft. This situation is commonly termed "close formation flight". One example of close formation flight is aerial refueling, where a receiver aircraft flies behind and below a tanker aircraft. Close formation flight can also be used for drag reduction, with follower aircraft flying in the beneficial upwash generated by the leaders, as is common in migratory birds.

It is very difficult for pilots to maintain the proper position for long intervals of close formation flight due to the high pilot workload. To rectify this, some sort of automatic positioning system is desirable. Such a system must be able to determine the relative locations of the aircraft to a high degree of accuracy (within feet), to avoid the possibility of a collision. Unmanned aircraft in close formation flight also require such a system.

The present invention uses two or more air data sensors on the follower aircraft, located several feet from one another in either the lateral or vertical direction. The air data sensors must be of the type that can measure the impact pressure (and resultant horizontal velocity), the angle of attack, and the angle of sideslip, such as the system disclosed by Hagen (U.S. Pat. No. 4,836,019). These measurements can be converted to horizontal, vertical and lateral velocity components.

The wake vortex system of the lead aircraft generates horizontal, vertical and lateral induced velocities that vary with horizontal, vertical and lateral position from the wing. By comparing the velocity component measurements from the sensors of the follower aircraft, using the known distance between the sensors on the follower aircraft and the wing span of the lead aircraft, the distance from the follower aircraft to the lead aircraft can be determined. If the conditions of the lead aircraft (weight, speed and altitude) are known, then two sensors on the follower aircraft will be sufficient to determine the relative positions. If the conditions of the lead aircraft are not known, then three sensors on the follower aircraft will be sufficient to determine the relative positions.

There are various means for determining relative position of aircraft in a formation, each of which has disadvantages.

U.S. Pat. No. 4,763,861, Microwave Rendezvous System for Aerial Refueling, issued to Newman, discloses a system that transmits microwave signals from the lead aircraft (tanker) to the follower aircraft, which processes these signals to determine the relative position. This system requires equipment to be installed on all of the aircraft in the formation, and is thus not a completely self contained system.

U.S. Pat. No. 5,904,729, Automatic Director Light System for Aerial Refueling Operations, issued to Rizicka, discloses a system that uses a 3-D camera on a follower aircraft which in combination with stored 3-D images of the lead aircraft and a data processor, determines the position of the lead aircraft relative to the follower aircraft. This system cannot be used if the aircraft are in clouds or if the field of view of the camera is blinded by the sun, so it is not an all weather system.

U.S. Pat. No. 5,906,336, Method and Apparatus for Temporarily Interconnecting an Unmanned Aerial Vehicle, issued to Eckstein, discloses a system that transmits either electro-optical, radar or infrared signals from the lead aircraft or an object towed from it to the follower aircraft. This system requires equipment to be installed on all of the aircraft in the formation, and is thus not a completely self contained system.

U.S. Pat. No. 6,963,291, Dynamic Wake Prediction and Visualization with Uncertainty Analysis, issued to Holforty et al, 2005, discloses a system that predicts the location and movement of trailing wakes of other aircraft using a combination of inertial navigation system and air data system measurements on the vortex generating aircraft. The purpose of this system is to predict the long term position of wakes so they can be avoided by follower aircraft. It uses accepted mathematical models to represent the wake. This system uses either GPS (Global Positioning System) or ADS-B (Automatic Dependent Surveillance Broadcast) signal to determine the position of the vortex generating aircraft. This system requires a data link between lead and follower aircraft (or between the aircraft and the ground) so it is subject to jamming.

U.S. Pat. No. 6,963,795, Vehicle Position Keeping System, issued to Hassig et al, discloses a system that uses a data link between the leader and follower vehicles in the formation. The follower vehicles use their velocity and angular rate information to determine guidance corrections to maintain position. This system requires a data link between lead and follower aircraft (or between the aircraft and the ground) so it is subject to jamming.

U.S. Pat. No. 7,024,309, Autonomous Station Keeping System for Formation Flight, issued to Doane et al, discloses a system that uses either GPS or millimeter wave radar signals. The sensors and computational algorithms of this system allow the relative position of the aircraft to be determined within about 1 meter. This system requires equipment to be installed on all of the aircraft in the formation, and is thus not a completely self contained system. The system also requires a data link between the aircraft so it is subject to jamming.

Some advantages of the present invention are that it is a totally self contained system that does not require a data link to any other aircraft or to the ground and, therefore, is not subject to jamming and it requires sensors only on the follower aircraft, thereby enabling a cost savings. Furthermore, the present invention can be used in all weather operations including cloudy or foggy weather.

SUMMARY OF THE INVENTION

The invention is a method for determining the relative position of an aircraft flying behind another while in close proximity, for example the receiver aircraft while aerial refueling, or follower aircraft in a two aircraft close formation. The method consists of having two or more air data systems on the follower aircraft located at or near the extremities, for example at the nose, tail and wingtip; nose and both wing tips, etc.

First, the method takes the measured angle of attack, sideslip and total velocity at each location and converts the readings into u, v and w velocity components in wind axes. Since the follower aircraft is within the wake vortex flowfield of the lead aircraft, the velocity components measured at the different sensor locations will be different since the wake induced velocities are functions of distance from the lead aircraft and the measurement locations are widely spaced. By analyzing the difference between the measurements using known wake vortex flowfield models, the distance from the follower airplane to the lead airplane can be determined.

This invention can be applied to the problem of automated aerial refueling. Many other approaches have been propose or tried for this problem, but they either require data from both the tanker and receiver (i.e. differential GPS) which necessitates a data link, or have other limitations. The proposed system has none of these limitations.

Two air data systems are required if the conditions of the lead aircraft (weight, speed) are known. Three air data systems are required if the conditions of the lead aircraft are unknown. The system is completely self-contained, so it does not require any kind of data link to other aircraft or the ground. It is not subject to jamming, and it can be used in all weather (night, clouds, sun in field of view, etc.). The invention can also be used as a backup system to a GPS or other system since redundancy is highly desirable for reasons of safety.

The invention can be used for commercial aerial refueling which is now under study in the air freight industry. At some point in the future, commercial refueling may become viable for passenger travel.

DETAILED DESCRIPTION

Lift on a wing is developed from the difference in air pressure on the upper and lower surfaces. The air pressure on the lower surface is higher than that on the upper surface, resulting in a lift force. At the wing tips, the flow curls around the tips, establishing a circulatory motion that trails downstream, resulting in a vortex whose axis is aligned with the flight path of the lead aircraft. A "horseshoe vortex" is a well established model for this trailing vortex structure. With the horseshoe vortex model, the wing itself is replaced by a bound vortex that is connected to each tip vortex thereby forming a horseshoe or U-shaped vortex. Near the center of these vortices, very high local velocities are present that decrease in air velocity magnitude as the radial distance from the center of the vortex increases. The magnitude of the velocities is proportional to the strength ($\Gamma$) of the vortex. The strength is directly proportional to the weight of the aircraft (W), divided by: the wing span (b), the airspeed (V), and the air density ($\rho$), which is related to altitude. This relationship is expressed by the formula:

$$\Gamma = \frac{W}{\rho V b (\pi/4)}$$

The behavior of the vortex system far downstream of the lead aircraft becomes less and less predictable as the distance behind the aircraft increases. The vortices will slowly descend (typically about 5 ft/sec for a large aircraft) and can twist and turn depending on the local prevailing wind pattern. Eventually, the vortices will dissipate, but this can be as much as five miles behind the lead aircraft or longer. The present invention is suitable if the follower aircraft is relatively close to the lead aircraft (less than three wing spans downstream), where the motion of the vortex system is well established.

Figure 1:
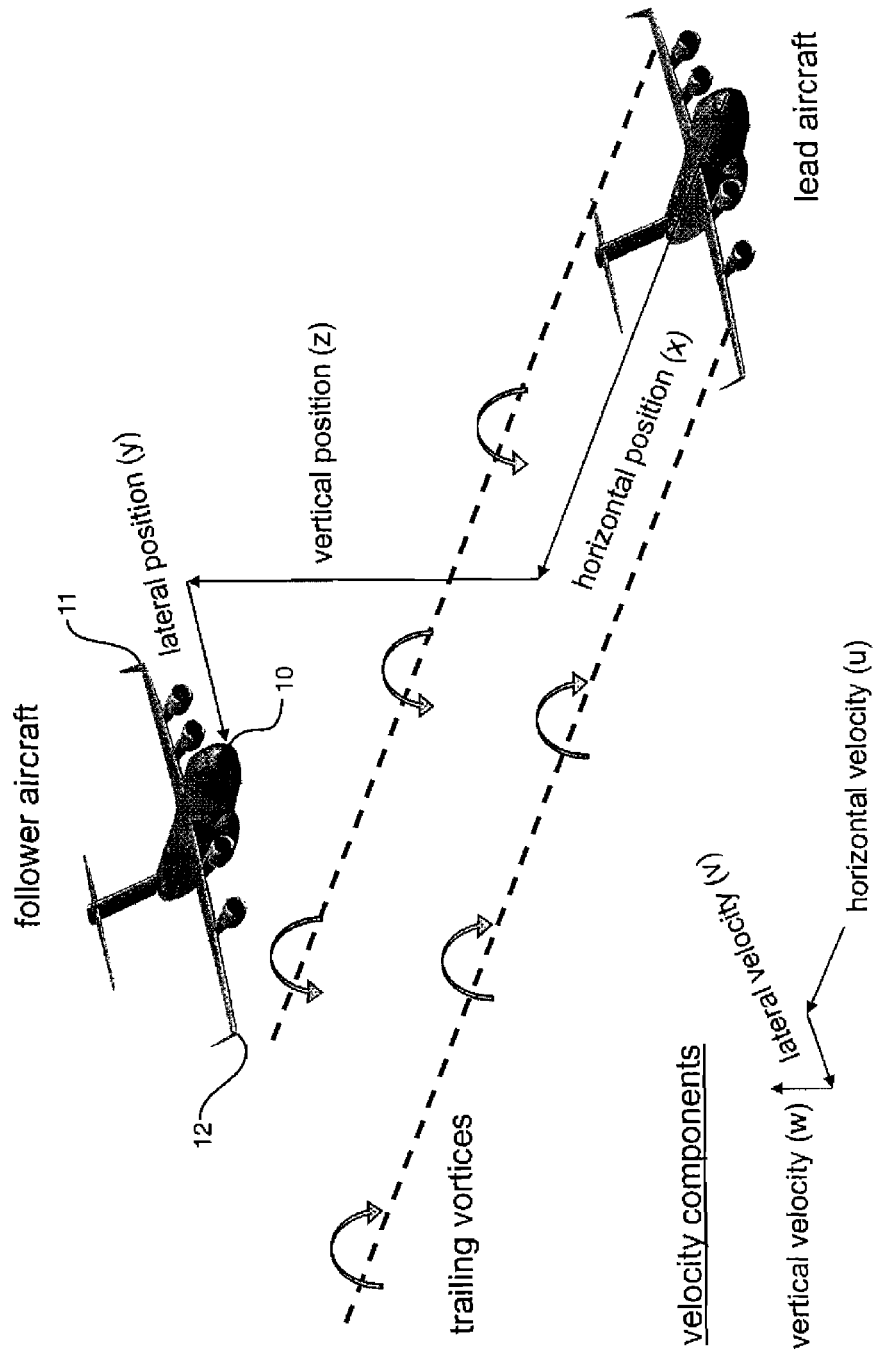
FIG. 1 shows two aircraft flying in formation, the relative distance between the aircraft, the trailing wake vortices from the lead aircraft, and the directions of the velocity components vertical (w), lateral (v) and horizontal (u).

FIG. 1 shows two aircraft flying in formation, the relative distance between the aircraft, the trailing wake vortices from the lead aircraft, and the directions of the velocity components vertical (w), lateral (v) and horizontal (u).

Figure 2:
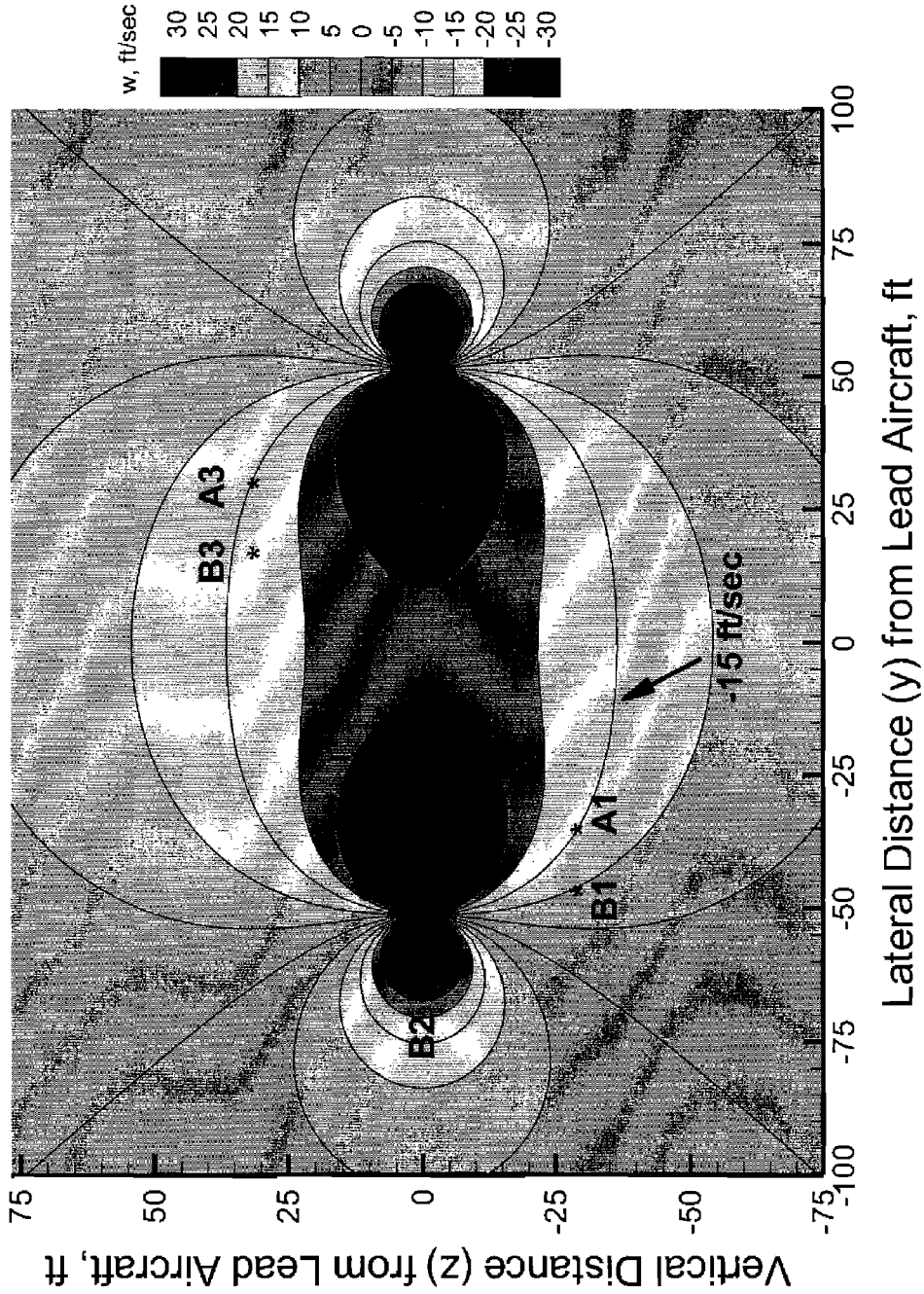
FIG. 2 shows vertical velocity (w) contours 50 feet behind a KC-135.
Figure 3:
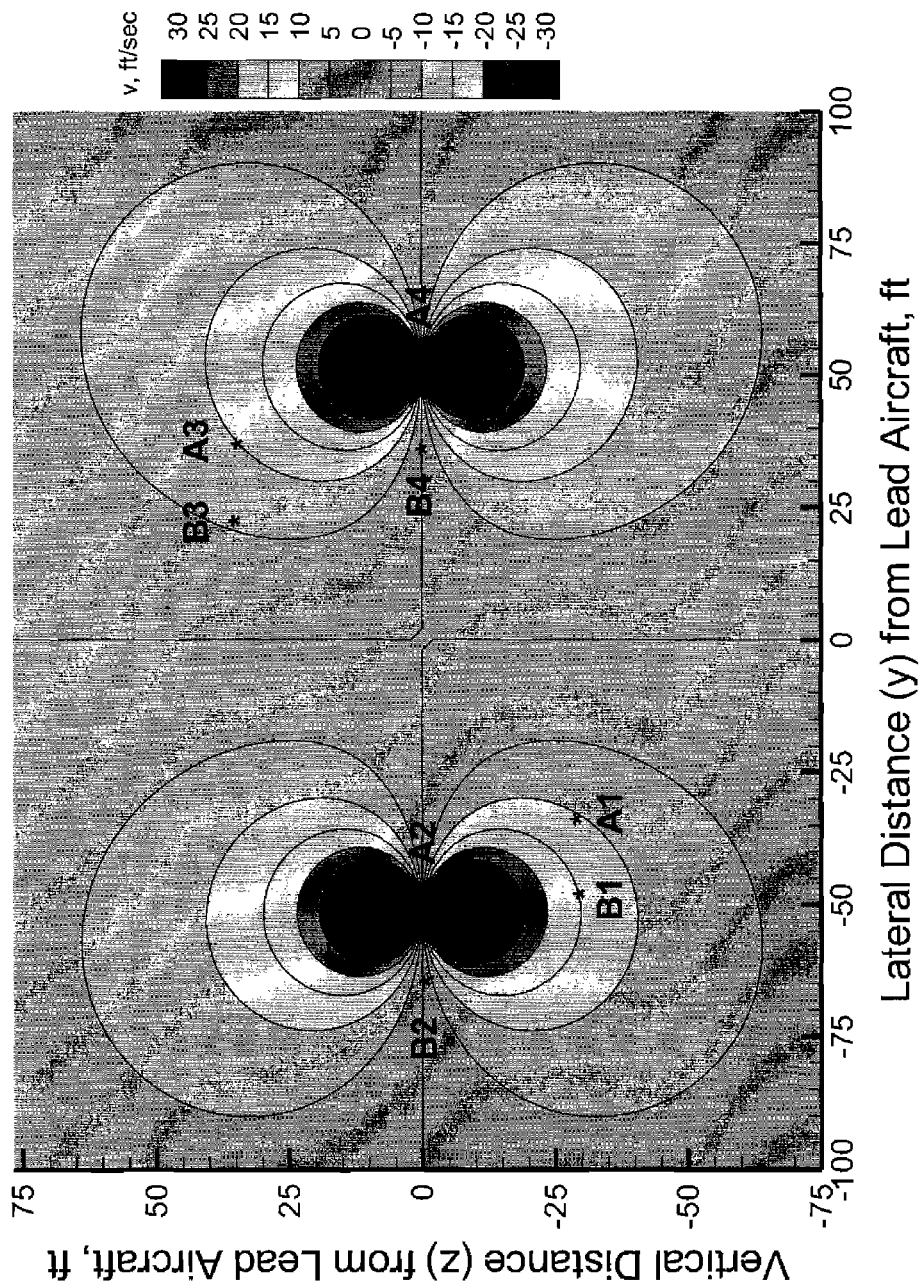
FIG. 3 shows lateral velocity (v) contours 50 feet behind a KC-135.
Figure 4:
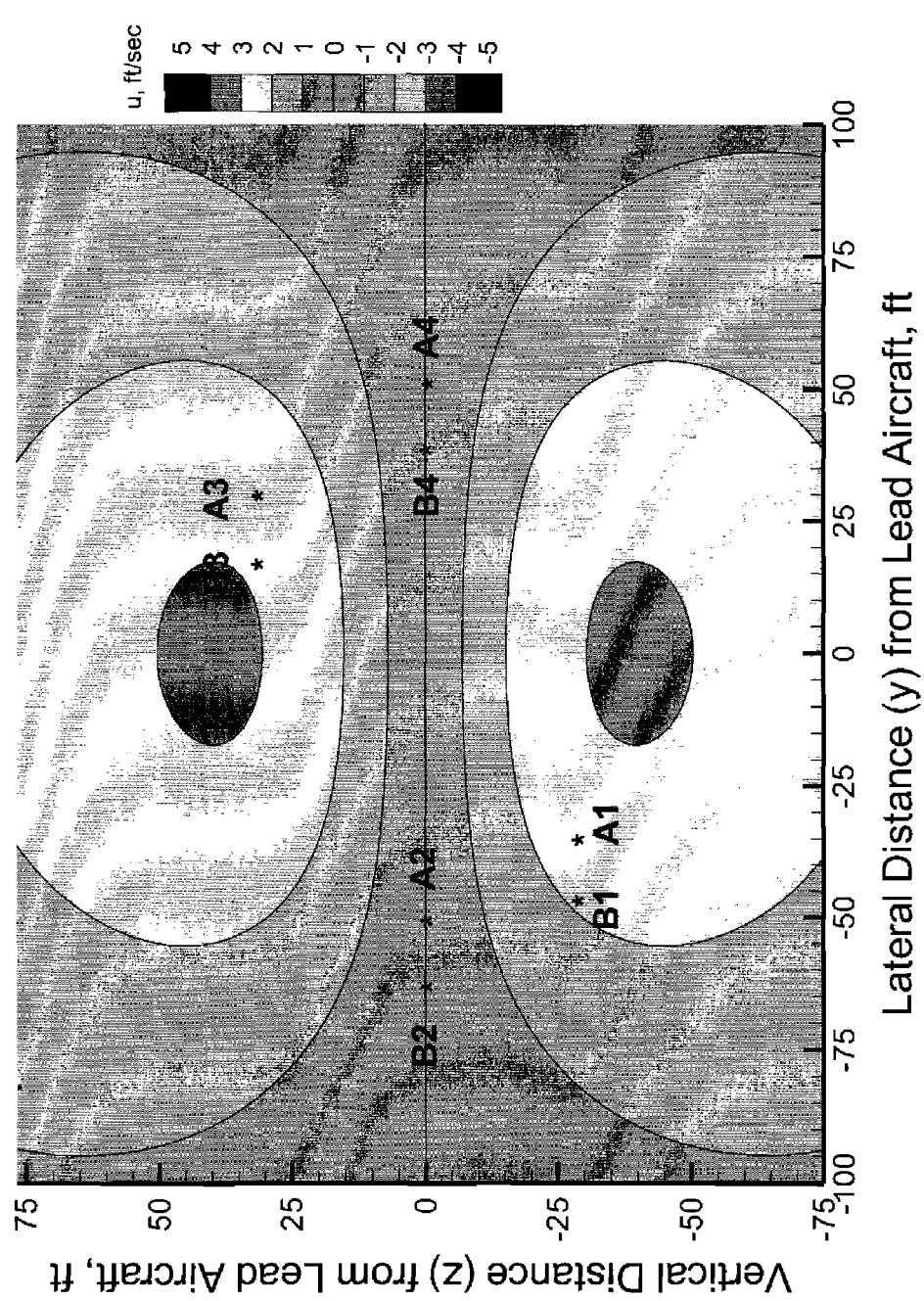
FIG. 4 shows forward velocity (u) contours 50 feet behind a KC-135.

A description of a preferred method of how the system works will be provided by means on an example. The assumed lead aircraft is a KC-135 tanker, with a wingspan of 130.83 ft. The assumed flight condition is 680 ft/sec at 30,000 ft altitude with a vehicle weight of 200,000 lb. FIGS. 2, 3 and 4 are plotted graphs showing the vertical (w), lateral (v) and horizontal (u) velocity components induced by the vortex system from this aircraft, at a distance of 50 ft behind the wing. The vertical velocity component (w) is symmetric about the centerline of the aircraft, and symmetric above and below the plane of the wing. The lateral velocity component (v) is anti-symmetric about the same planes. The horizontal velocity component (u) exhibits the same symmetry characteristics as the vertical velocity component (w). These symmetries arise because the relation between the relative distances and induced velocities is second order in terms of the distance. Given a single (u,v,w) measurement, there is not a unique set of (x,y,z) relative positions that yield this measurement, due to multiple mathematical solutions arising from these symmetries.

A follower aircraft has an airspeed sensor 10 at the nose (typical location for modern aircraft). A typical sensor can measure the airspeed, angle of attack ($\alpha$) and angle of sideslip ($\beta$). These can be converted to local velocities along the forward, lateral and vertical axis of the follower aircraft. If the follower aircraft is also equipped with sensors that can measure the pitch attitude ($\theta$), roll attitude and rate of climb or descent (standard equipment on most aircraft), these velocities can be converted to horizontal, vertical and lateral velocity components relative to the flight path. The velocity components due to the vortex system of the lead aircraft can then be determined as follows:

$u = (V \cos \alpha \cos \beta) \cos \theta + (V \sin \alpha \cos \beta) \sin \theta$ $v = V \sin \beta$ $w = (V \sin \alpha \cos \beta) \cos \theta - (V \cos \alpha \cos \beta) \sin \theta$ These equations include the effect of the pitch attitude of the airplane, in the event that it is non-zero:

For example, assume that the follower aircraft is in level flight (not climbing or descending). In this case, the measured angle of attack should equal the pitch attitude, and the vertical velocity (w) relative to the flight path should be zero. If it is not, the wake vortex from the lead aircraft has affected the angle of attack measurement, and the resultant vertical velocity can be attributed to the wake vortex system from the lead aircraft.

Looking at FIG. 2, assume that the vertical velocity component (w) of the wake is measured as −15 ft/sec (downward). That places the nose of the follower aircraft somewhere in the −15 ft/sec oval shown in FIG. 2. If the sideward velocity component (v) of the wake is measured as −10 ft/sec (to the left), inspection of FIG. 3 shows that the follower aircraft must be located at either point A1, A2, A3 or A4 on the −15 ft/sec oval.

The horizontal velocity component (u) can be used to determine the position of the follower aircraft. However, it is not practical to use the horizontal velocity component since it is very small, especially when compared to the airspeed of the follower aircraft. It is not possible to determine the true airspeed of the follower aircraft without knowing the true airspeed of the lead aircraft, which would require some sort of data link between the aircraft, which the present invention is intended to avoid.

If we add a second airspeed sensor 11 to the follower aircraft, far enough away from the nose sensor 10 so that the vortex induced velocities will differ at that position (at the tail or wingtip, for example), it is possible to determine the actual location of the follower aircraft with respect to the lead aircraft. Consider FIG. 2 again and assume that the second sensor is located 10 ft to the left of the first sensor, near the left wing tip. These sensor locations are shown as points B1, B2, B3 and B4 on FIGS. 2 and 3.

The vertical component (w) of the velocity is different at each of these locations, so it is possible to determine whether the nose of the aircraft is at position A1, A2, A3 or A4 based on the reading of the second sensor. For almost every possible location of the follower aircraft, the vertical velocity component (w) measured by the second sensor will differ from that measured by the first sensor, due to the symmetric characteristic of the vertical induced velocity, so it will be possible to determine the location of the follower aircraft with respect to the lead aircraft with the vertical velocity reading only from the second sensor. The only exception is when the sensors are equally spaced about the center of the lead aircraft. In this case, the vertical velocity readings from both sensors will be the same. However, the lateral velocity (v) readings will be equal but of opposite sign depending on whether the follower aircraft is above or below the lead aircraft. It is thus still be possible to determine the exact location of the follower aircraft with respect to the lead aircraft.

The lateral velocity (v) readings in FIG. 3 can be used to determine the distance behind the lead aircraft. In the example above, if the readings for the two sensors match the values shown in FIG. 3, then the follower vehicle is 50 ft behind the lead aircraft since the results were generated for that case. Lateral velocities increase as the distance behind the lead aircraft increases, and vice versa. If the lateral velocity measurements are larger than shown on FIG. 3, the follower aircraft is more than 50 ft behind the lead aircraft. The actual distance depends on the magnitude of the increase in lateral velocity. The change in lateral velocity becomes very small when the follower aircraft is far behind the lead aircraft. If the follower aircraft is more than about two wing spans behind the lead aircraft, the changes in lateral velocity will be too small to accurately measure. For the example of a KC-135 lead aircraft, this corresponds to a limit of about 250 ft behind the airplane.

The foregoing analysis assumes that the wake vortex strength (Γ) of the lead aircraft is known, i.e., actual numerical values can be assigned to the velocities shown on FIGS. 2 and 3. The wake vortex strength is a function of the wingspan, airspeed, altitude and weight of the lead aircraft. In practice, the wing span and altitude of the lead aircraft would be known. The airspeed would be known to a high degree of accuracy since the vortex induced contribution to the forward velocity is so small, so the measured horizontal velocity component (u) of the follower aircraft can be assumed to be the velocity of the lead aircraft. The weight may or may not be known, depending on the type of mission. If it is not known, then a data link would be required between the aircraft, or between each aircraft and the ground, which the present invention is intended to avoid.

The problem of unknown wake vortex strength (due to the unknown weight of the lead aircraft) can be overcome by adding a third airspeed sensor at another location on the aircraft, sufficiently removed from the first two so that vortex induced velocities will be different at that position (at the other wingtip, for example). The ratio of the vertical velocity (w) or lateral velocity (v) components measured between any two of these sensors is independent of the wake vortex strength of the lead aircraft. This is because the induced velocities vary in a linear fashion with vortex strength, and the vortex strength cancels when a ratio is computed. This means that a plot of the velocity ratios will be independent of the weight, speed and altitude of the leader aircraft.

The problem with simply dividing one measurement by another is that it is possible that one of the sensors will be located at the position where the vortex induced velocity is zero, which results in a division by zero. If the denominator is taken to be the sum of the two measurements, there is still an issue if the measurements are equal and opposite, where division by zero would still result. The solution is to limit the cases where the denominator can be zero. One such method makes the denominator the sum of the squares of the measurements $(w_1^2+w_2^2)$. This can only be zero if both measurements are zero, which is only possible for the vertical velocity ratio if the distance between the sensors is greater than or equal to the distance between the trailing vortices on the lead aircraft, which is only possible if the follower aircraft is much larger than the lead aircraft, since it has been assumed that one of the sensors is at the nose of the follower aircraft. The numerator of the ratio is not the velocity squared but rather the velocity times the absolute value of the velocity, $w_1|w_1|$. This preserves the sign of the velocity, and results in a value of the ratio that is bounded by −1 and 1.

If we assume the sensors on the follower aircraft are 10 feet apart, FIG. 4 shows contours of the vertical velocity ratio:

$$\frac{w_1|w_1|}{w_1^2 + w_2^2}$$

Figure 5:
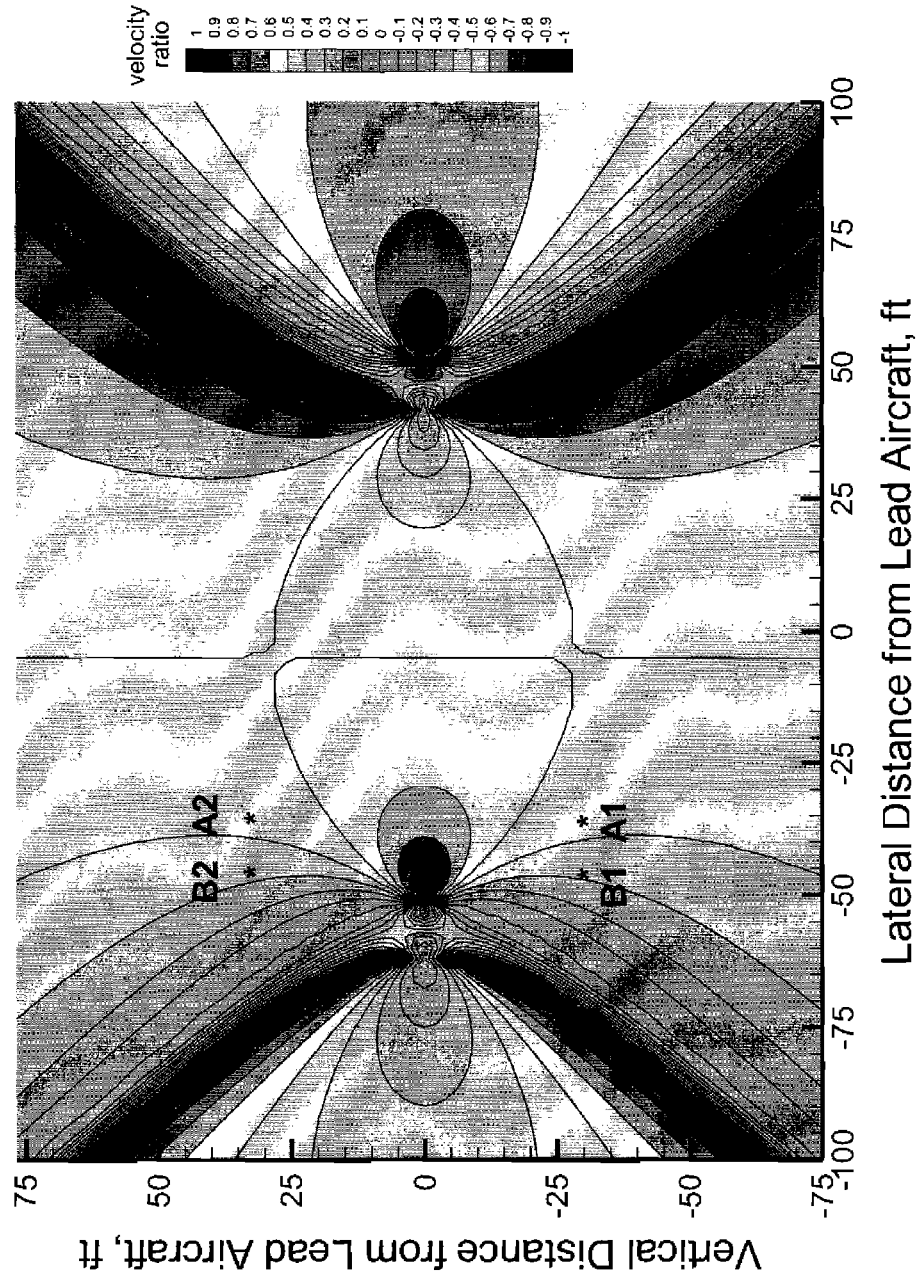
FIG. 5 shows vertical velocity ratio contours 50 feet behind a KC-135.
Figure 6:
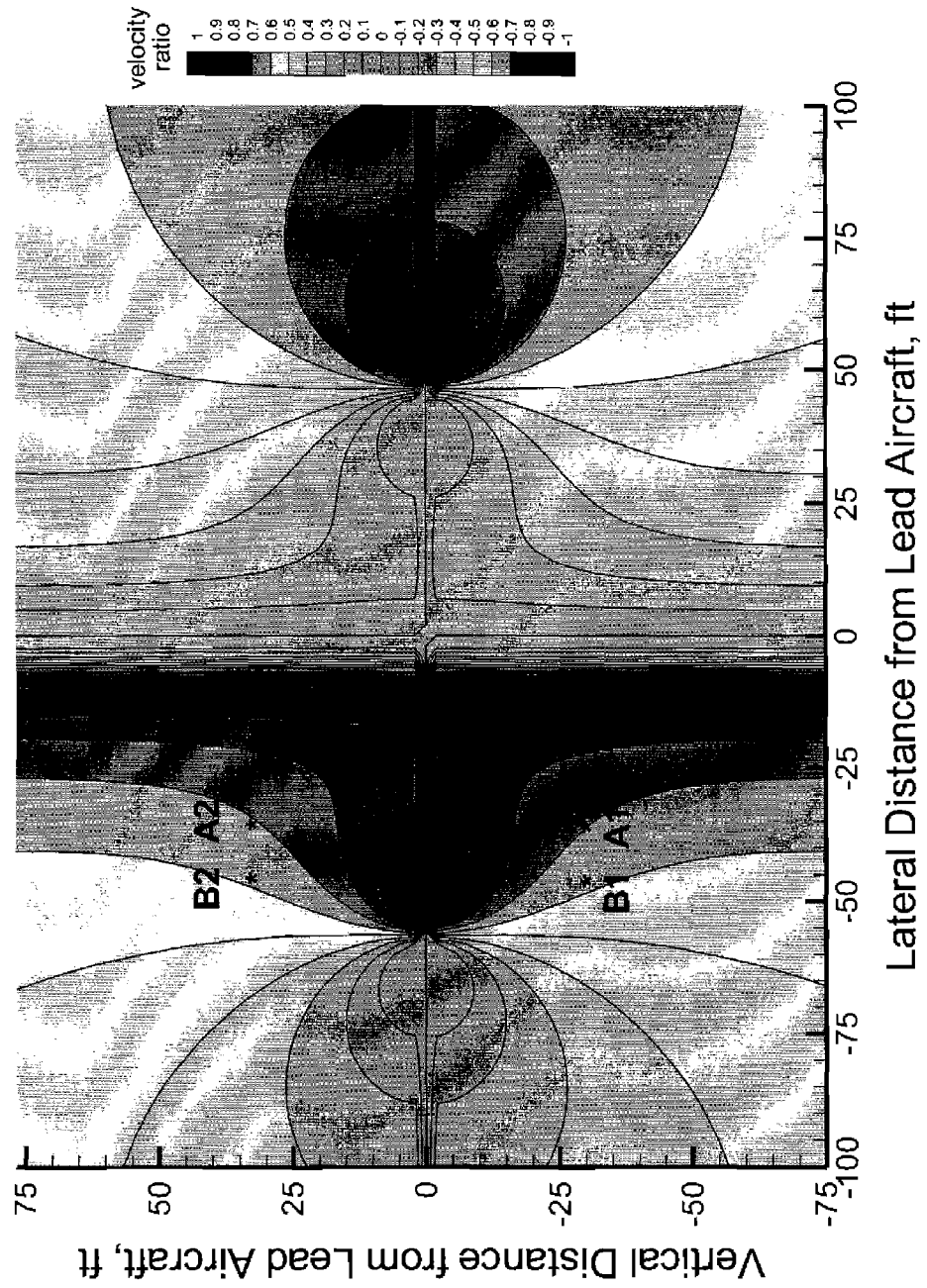
FIG. 6 shows lateral velocity ratio contours 50 feet behind a KC-135.

A similar analysis can be used to develop a lateral velocity ratio, shown in FIG. 5:

$$\frac{v_1|v_1|}{v_1^2 + v_2^2}$$

FIGS. 4 and 5 are valid for any speed, altitude and weight of the KC-135, i.e. they are independent of flight condition. For another lead aircraft, the figure scales in direct proportion to the wingspan of that aircraft.

Assume, from the prior example, the follower aircraft has three sensors. The first sensor 10 is at the nose, the second sensor 11 is near the left wing tip, 10 ft from the nose, and the third sensor 12 is near the right wing tip, also 10 ft from the nose. The vertical velocity ratio for the nose sensor, with the second sensor located at the right wingtip, is shown as point A1 with a measured value of −0.44. The vertical velocity ratio for the left wingtip sensor, with the second sensor being the nose sensor, is shown as point B1 and yields a value of −0.33. Due to the symmetry of the vertical velocity ratio, there is another possible position for the sensors, shown as points A2 and B2. The lateral velocity ratio measurement can be used to determine which one is the actual position. If the lateral velocity ratio is negative, then the sensors are located at A1 and B1 and vice versa. If the magnitude of the lateral velocity differs from that shown in FIGS. 2 and 3, then the aircraft is at a different longitudinal location.

If both sensors on the follower aircraft are in the horizontal plane of symmetry of the lead aircraft, the lateral velocity measurements will be zero, resulting in a denominator of zero in the lateral velocity ratio. This is not a problem because in this case, there are not multiple solutions for the possible position. If the vertical velocity ratio measurements do not correspond to any position on FIG. 4, then the aircraft is at a different longitudinal location.

The overall accuracy of the system depends on the accuracy of the air data sensor measurements, as well as how far the follower aircraft is from the lead aircraft. As the distance from the lead aircraft increases, the accuracy degrades. As an example, we will consider the KC-135 scenario presented above and assume that the follower aircraft is attempting to maintain a position for aerial refueling. In this case, the follower aircraft will be 30 ft below the lead aircraft with no lateral offset. If the angles of attack and sideslip measured by the air data system are accurate to within 0.1 degrees, the position can be determined to within 3 ft in the vertical direction and 5 ft in the horizontal direction.

What is claimed is:

1. A method for determining the position of a follower aircraft with respect to the position of a lead aircraft comprising the following steps:
    positioning two spaced apart sensors on the follower aircraft of the type that can measure airspeed, angle of attack, and angle of sideslip, which measurements can be converted to horizontal, vertical and lateral velocity vector components;
    measuring angle of attack, sideslip and total velocity at each of the two locations;
    converting the two airspeed, angle of attack, and angle of sideslip readings into horizontal (u), vertical (w), and lateral (v) velocity components in wind axes;
    calculating the vortex strength of the lead aircraft, based on an estimate of its weight, altitude and airspeed, and then calculating the wake vortex flowfield behind the lead aircraft using known flowfield models; and
    analyzing the difference between the two measurements using the calculated wake vortex flowfield models thereby determining the distance from the follower airplane to the lead airplane.

2. The method of claim 1 wherein the airspeed conversion uses the formulas:

$$u=(V\cos\alpha\cos\beta)\cos\theta+(V\sin\alpha\cos\beta)\sin\theta$$

$$v=V\sin\beta$$

$$w=(V\sin\alpha\cos\beta)\cos\theta-(V\cos\alpha\cos\beta)\sin\theta.$$

3. The method of claim 1 wherein the vortex strength is calculated using the formula:

$$\Gamma = \frac{W}{\rho V b(\pi/4)}.$$

4. A method for determining the position of a follower aircraft with respect to the position of a lead aircraft comprising the following steps:
    positioning three spaced apart sensors on the follower aircraft of the type that can measure airspeed, angle of attack, and angle of sideslip, which measurements can be converted to horizontal, vertical and lateral velocity vector components;
    measuring angle of attack, sideslip and total velocity at each of the three locations;
    converting the three airspeed, angle of attack, and angle of sideslip readings into horizontal (u), vertical (w), and lateral (v) velocity components in wind axes;
    calculating non-dimensional ratios of these velocities using known flowfield models; and
    analyzing the difference between the three measurements using the calculated wake vortex flowfield models thereby determining the distance from the follower airplane to the lead airplane.

5. The method of claim 4 wherein the airspeed conversion uses the formulas:

$$u=(V\cos\alpha\cos\beta)\cos\theta+(V\sin\alpha\cos\beta)\sin\theta$$

$$v=V\sin\beta$$

$$w=(V\sin\alpha\cos\beta)\cos\theta-(V\cos\alpha\cos\beta)\sin\theta.$$

6. The method of claim 4 wherein the non-dimensional ratio of velocities is calculated using the formulas:

$$\frac{w_1|w_1|}{w_1^2+w_2^2}$$

$$\frac{v_1|v_1|}{v_1^2+v_2^2},$$

wherein the subscripts represent readings from different sensors.

* * * * *